United States Patent
Hey et al.

(10) Patent No.: US 10,184,459 B2
(45) Date of Patent: Jan. 22, 2019

(54) DISCHARGE CHAMBER OF AN ION DRIVE, ION DRIVE HAVING A DISCHARGE CHAMBER, AND A DIAPHRAGM FOR BEING AFFIXED IN A DISCHARGE CHAMBER OF AN ION DRIVE

(71) Applicant: Airbus DS GmbH, Taufkirchen (DE)

(72) Inventors: Franz Georg Hey, Constance (DE); Guenter Kornfeld, Elchingen (DE); Ulrich Johann, Salem (DE)

(73) Assignee: Airbus DS GmbH, Taufkirchen (DE)

( * ) Notice: Subject to any disclaimer, the term of this patent is extended or adjusted under 35 U.S.C. 154(b) by 0 days.

(21) Appl. No.: 15/486,114

(22) Filed: Apr. 12, 2017

(65) Prior Publication Data
US 2017/0292505 A1 Oct. 12, 2017

(30) Foreign Application Priority Data
Apr. 12, 2016 (DE) .................. 10 2016 206 039

(51) Int. Cl.
*F03H 1/00* (2006.01)
*B64G 1/40* (2006.01)
*H05H 1/54* (2006.01)

(52) U.S. Cl.
CPC ........... *F03H 1/0037* (2013.01); *B64G 1/405* (2013.01); *F03H 1/0006* (2013.01); *H05H 1/54* (2013.01)

(58) Field of Classification Search
CPC ........ F03H 1/003; F03H 1/0043; F03H 1/005; F03H 1/0056; F03H 1/0037; F03H 1/0062; F03H 1/0068; F03H 1/0075
See application file for complete search history.

(56) References Cited

U.S. PATENT DOCUMENTS

| 3,243,954 | A | | 4/1966 | Cann |
| 4,466,242 | A | * | 8/1984 | Sovey ................... F03H 1/0056 60/202 |
| 6,259,102 | B1 | | 7/2001 | Shun'ko |
| 6,523,338 | B1 | | 2/2003 | Kornfeld et al. |
| 7,084,572 | B2 | | 8/2006 | Kornfeld et al. |
| 7,247,992 | B2 | | 7/2007 | Kornfeld et al. |
| 2003/0006708 | A1 | | 1/2003 | Leung et al. |
| 2005/0212442 | A1 | * | 9/2005 | Kornfeld ............... F03H 1/0062 315/111.61 |

(Continued)

FOREIGN PATENT DOCUMENTS

| DE | 1233340 | 1/1967 |
| DE | 102006059264 | 6/2008 |

OTHER PUBLICATIONS

Harvey "The Effect of the 2-Dimensional Magnetic Field Profile in Hall Thrusters" 2014.*

(Continued)

*Primary Examiner* — Gerald L Sung
*Assistant Examiner* — William Breazeal
(74) *Attorney, Agent, or Firm* — Greer, Burns & Crain, Ltd.

(57) ABSTRACT

A discharge chamber of an ion drive, an ion drive having a discharge chamber, and a diaphragm for being affixed in a discharge chamber of an ion drive. The discharge chamber comprises a diaphragm, wherein the diaphragm of the discharge chamber comprises a magnet and is disposed and/or affixed in the discharge chamber.

9 Claims, 4 Drawing Sheets

(56) References Cited

U.S. PATENT DOCUMENTS

2008/0047256 A1 2/2008 Gallimore et al.
2015/0098543 A1 4/2015 Cohen et al.

OTHER PUBLICATIONS

Blanco Engineering Drawing and Sketching 2008, http://www.me.umn.edu/courses/me2011/handouts/drawing/blanco-tutorial.html.*
German Search Report, dated Jan. 1, 2017 for Appl. No. 10 2016 206 039.2.

* cited by examiner

DISCHARGE CHAMBER OF AN ION DRIVE, ION DRIVE HAVING A DISCHARGE CHAMBER, AND A DIAPHRAGM FOR BEING AFFIXED IN A DISCHARGE CHAMBER OF AN ION DRIVE

CROSS REFERENCE TO RELATED APPLICATIONS

This application claims priority to German Patent Application No. 10 2016 206 039.2 filed on Apr. 12, 2016, the entirety of which is incorporated herein by reference.

FIELD OF THE INVENTION

The present invention relates to a discharge chamber of an ion drive, an ion drive having a discharge chamber, and a diaphragm for being affixed in a discharge chamber of an ion drive.

In optimizing the efficiency of electrical drive thrusters, which work with magnetically enclosed or dominated plasmas, such as a Hall effect thruster or a HEMP thruster, and the ion discharge of which is used to drive satellites or other space vehicles, there is a decrease in the ionization efficiency and therefore in a specific impulse and an overall efficiency in the development of thrusters for very small boosts in the range of μN to a few mN in comparison with thrusters for several 10 mN to several 100 mN.

The cause of this is the scaling laws for magnetically enclosed or dominated plasmas. Vice versa, these plasmas would require increased values for the magnetic flux density, to the same degree, if the geometry of the thrusters were reduced in size, in order to keep the ratio of wall dimensions and Larmor radius of the electrons constant. However, these increased values of the magnetic flux density are not possible, due to the absence of magnetic materials having correspondingly high energy products in the case of permanent magnets or high permeabilities in the case of ferromagnets. In the end result, an increased plasma wall loss comes about due to recombination of ions and electrons to form neutral gas consisting of neutral gas atoms and/or gas molecules, and thereby reduced ionization efficiency and overall efficiency come about. Due to a reduction in a gas flow in the discharge chamber of the thruster, in contrast to avoiding or reducing the actually required geometrical reduction in size of the ionization chamber, the neutral gas density decreases, and with it the free path length of the electrons up to an ionization thrust increases, and the ionization probability decreases accordingly. Proportionally, non-ionized and non-accelerated gas therefore exits through the exit surface of the discharge chamber to an increasing degree. In the end result, reduced ionization efficiency and overall efficiency of the thruster are caused by this.

The present invention is based on the task of maintaining the neutral gas pressure even at very small gas flows in the discharge region. In this way, better ionization efficiency can be achieved in the ionization region of a thruster.

SUMMARY OF THE INVENTION

According to a first aspect, the invention creates a discharge chamber of an ion drive, which chamber comprises a diaphragm. The diaphragm comprises a magnet. The diaphragm is disposed and/or affixed in the discharge chamber.

The terminology "the diaphragm comprises a magnet" can be understood to mean that the diaphragm itself is magnetic or demonstrates magnetic properties. The terminology "the diaphragm comprises a magnet" can also be understood to mean that a magnet is disposed or affixed on the diaphragm. Independent of the precise embodiment, the diaphragm can be magnetic, metallic and/or ceramic.

The effect achieved by the diaphragm disposed and/or affixed in the discharge chamber and comprising a magnet lies in increasing a density of a neutral gas. In this way, an increased ionization probability and an increased ion beam stream are achieved.

The ion drive is usually understood to be a drive in which the discharge of a neutralized ion beam is utilized for forward movement in accordance with the thrust principle. An ionized gas can be produced in the discharge chamber, which gas consists of electrically charged particles and is called a plasma. A neutral plasma consists of an equal amount of ionized positively charged gas ions and negatively charged electrons. The neutral plasma exists in the discharge chamber along with the neutral gas. The neutralized ion beam consists of accelerated positive ions and a negatively charged electron cloud that accompanies the beam. The electron cloud is added to the ion beam externally by means of what is called a neutralizer.

By introducing the diaphragm perpendicular to an axis of rotation of the ion drive, which axis is defined by the direction of an ion beam to be discharged, the neutral gas density in the ionization region of the thruster increases, and thereby the ionization efficiency and the specific impulse increase in the case of small gas flows.

The diaphragm can be disposed or affixed in an exit region of the discharge chamber. In this way, the ionization region is maximized, resulting in increased ionization efficiency.

The magnet can furthermore comprise a magnet array that is affixed on the diaphragm. The magnet can be the magnet array.

In this way, plasma wall losses at this diaphragm can be avoided by means of suitable magnetic shields. In addition, damage to the discharge chamber wall and to the ion drive can be prevented by means of introducing additional magnetic fields.

The magnet, for example the magnet array, can possess different dimensions. The magnet, for example the magnet array, can be disposed on the surface of the diaphragm, on the one hand. The magnet, for example the magnet array, can partially project into the diaphragm hole. The diaphragm hole can have an opening that is still sufficient to allow the neutral gas and the ion beam to pass through. The thickness of the magnet, for example of the magnet array, can deviate from the thickness of the diaphragm. This means that the magnet, for example the magnet array, can comprise elements that are thicker, for example, than the thickness of the diaphragm itself. The dimension(s) of the magnet array can deviate from the dimensions of the diaphragm.

The magnet, for example the magnet array, can furthermore be configured for constricting a magnetic field in the direction perpendicular to a common axis of rotation. The axis of rotation can be defined by the essential exit direction of an ion beam. The essential exit direction of the ion beam runs essentially in the opposite direction of a thruster boost. The common axis of rotation describes the axis of rotation of ion drive, discharge chamber and/or diaphragm.

The diaphragm can furthermore be circular. The magnet, for example the magnet array, can comprise at least one circular magnet ring. A magnet ring can be disposed in such a manner that it runs along a rotation direction of the diaphragm and forms part of the diaphragm, is disposed on the diaphragm or is disposed on both sides of the diaphragm, so that the diaphragm hole is surrounded by the at least one magnet ring. In this regard, the diaphragm hole can be partially reduced in size by the magnet ring.

The outer dimension of the diaphragm can be coordinated with the discharge chamber. The inner dimension of the diaphragm can be configured in such a manner that it does not go below a predetermined threshold value. The diaphragm can be shaped differently, in accordance with the discharge chamber, so that it can be affixed in different discharge chambers. The inner dimension of the diaphragm can be determined at a predetermined threshold value in accordance with a simulation; this threshold value can be optimized with regard to an optimal ion beam flow. In addition, the predetermined threshold value can be optimized by means of optimization to a lower thruster boost, greater thruster efficiency and/or lower neutral gas consumption.

According to a second aspect, the invention creates an ion drive having a discharge chamber according to the first aspect.

According to a third aspect, the invention creates a diaphragm for being disposed or affixed in a discharge chamber of an ion drive. The diaphragm comprises a magnet that is affixed on the diaphragm. The magnet is configured for constricting a magnetic field in the direction perpendicular to a common axis of rotation. The axis of rotation is defined by the essential exit direction of the neutral gas.

The magnet can comprise a magnet array that is disposed and/or affixed on the diaphragm. In addition or alternatively, the diaphragm itself can be magnetic.

The diaphragm can furthermore be circular and the magnet, for example the magnet array, can comprise at least one circular magnet ring.

Furthermore, one of the at least one circular magnetic rings can be disposed along the diaphragm hole.

The advantage of this is that the magnetic field is constricted in the direction of the axis of rotation and in the direction of the discharge chamber. This constriction prevents the impact of electrons and therefore also of ions on the diaphragm. Beyond this, the diaphragm leads to a significant increase in the neutral gas pressure within the discharge chamber.

The outer dimension can be coordinated with the discharge chamber. The inner dimension of the diaphragm can be designed in such a manner that it does not go below a predetermined threshold value.

In addition, ions can first impact the side surface of an insulated ceramic or metallic diaphragm and charge it positively, with charging leading to the result that during the further course, ionic contact with the diaphragm is also prevented. This means that in total, no or only very slight plasma wall losses occur at the diaphragm. This results in stable and efficient operation up to small gas flows and boost forces.

Even though some of the aspects described above were described with reference to the discharge chamber, these aspects can also apply to the ion drive having the discharge chamber, and to the diaphragm. In precisely the same manner, the aspects described above with reference to the diaphragm can apply in analogous manner to the discharge chamber and to the ion drive.

BRIEF DESCRIPTION OF THE DRAWINGS

The present invention will be explained further using figures. These figures schematically show.

DETAILED DESCRIPTION OF EMBODIMENTS OF THE INVENTION

Figure 1:
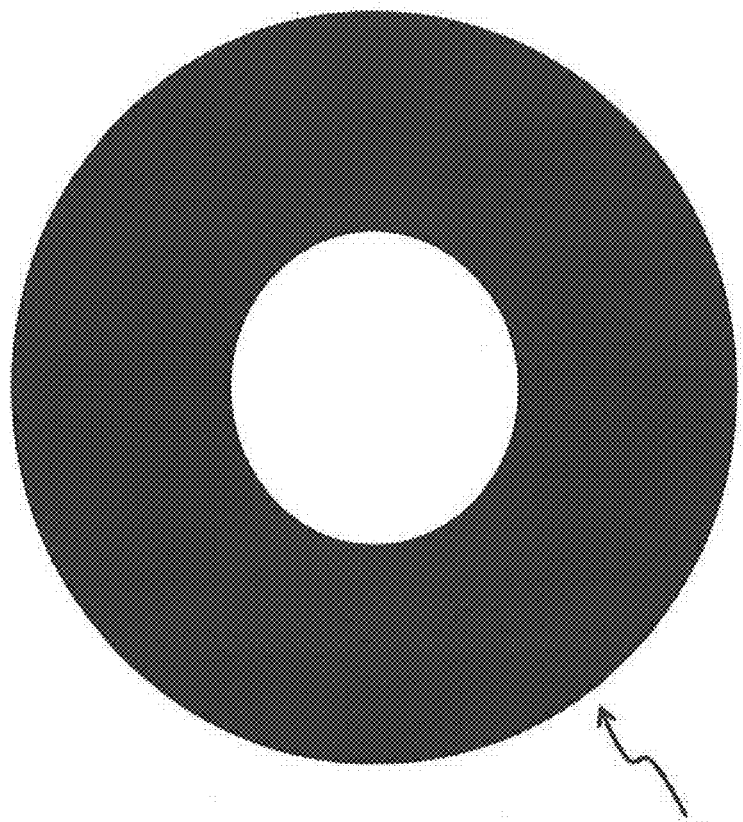
FIG. 1 shows a schematic representation of a cross-section of a diaphragm.
Figure 2:
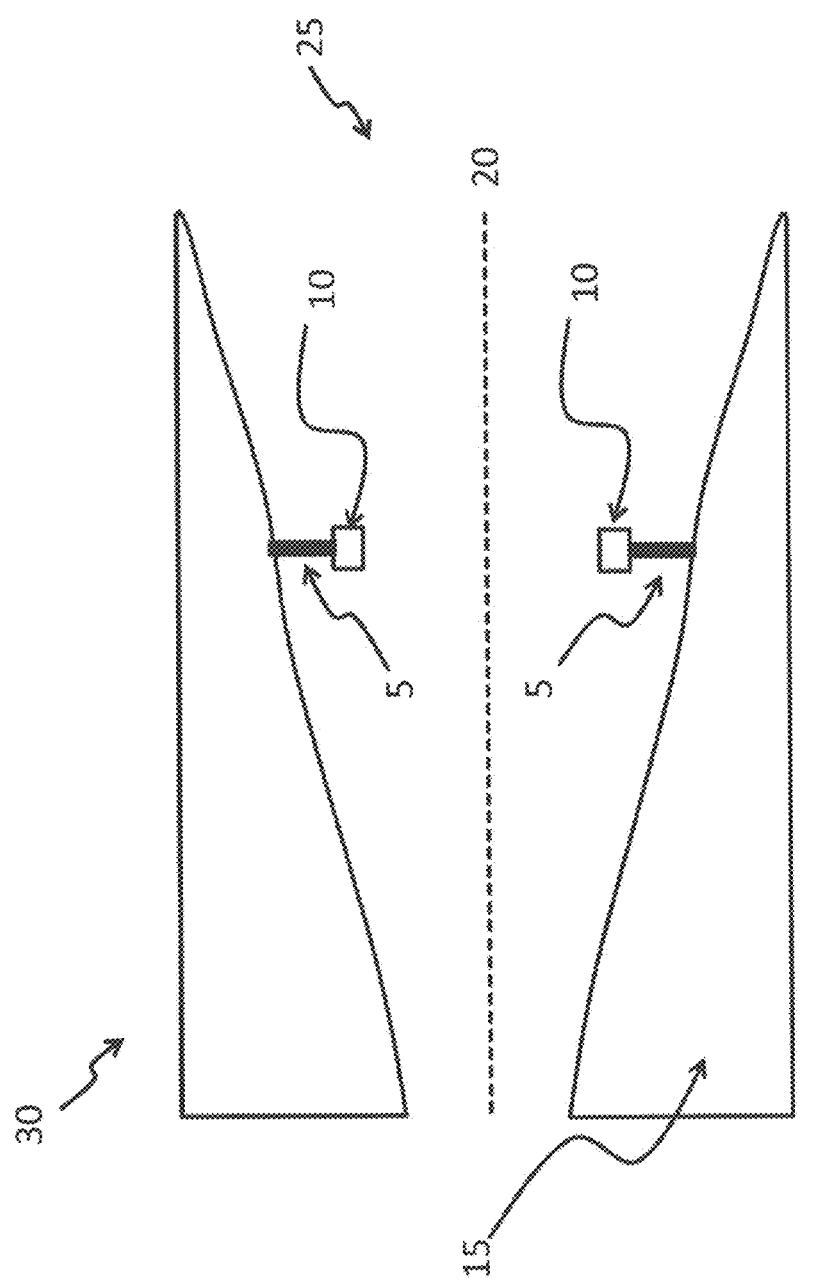
FIG. 2 shows a schematic representation of a longitudinal section of an ion drive having a discharge chamber and diaphragm in accordance with an exemplary embodiment of the present invention.

FIG. 1 schematically shows a cross-section of a diaphragm 5, which is supposed to be used to constrict a neutral gas flow in an ion drive. This diaphragm can be ceramic, metallic and/or magnetic. This diaphragm has a hole in the center, the size of which hole can be determined by means of prior simulations. The hole can also be interpreted as an inner dimension. The related outside dimension can be determined by means of the size conditions of the discharge chamber. The external dimension can also be interpreted as an outer dimension. Also, the inner dimension and the outer dimension can be designed for other ion drive geometries. These deviating geometries can be geometries that deviate from a round thruster structure. When they are used in the ion drive, an additional magnet can be used, as shown in FIG. 2. This magnet generates a magnetic field that affects the electron flow and furthermore affects the ion flow.

FIG. 2 schematically shows a longitudinal section of an ion drive 30 having a discharge chamber 25 and diaphragm 5 in accordance with an exemplary embodiment of the present invention. In this regard, the diaphragm 5 is connected with a magnet array 10 that is disposed on the diaphragm in circular shape. The axis of rotation 20 along the ion drive opening, along the axis of rotation 20 toward the right in the figure, illustrates the rotation symmetry of an ion drive and indicates the essential exit direction of the ion beam and of the neutral gas. The axis of rotation 20 represents the mirror axis along the ion drive 30. The ion source 15 represents the thruster structure 15 as an example here, with the opening becoming larger in the direction of the ion drive opening. The placement of the diaphragm 5 and of the magnet array 10 accordingly represents narrowing of the thruster at the location of affixation.

Figure 3:
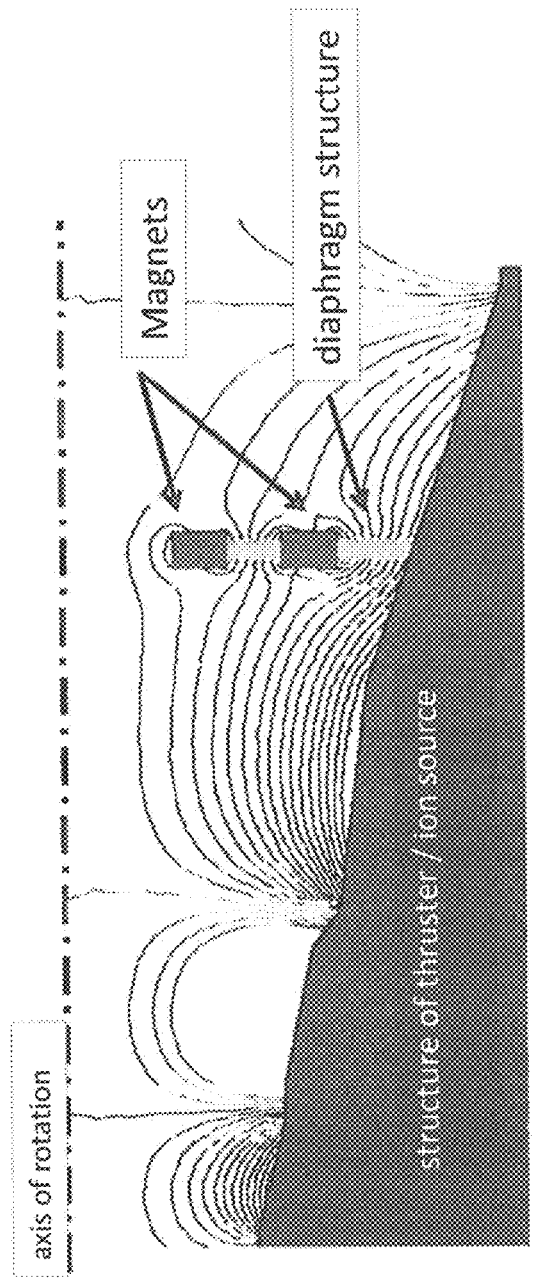
FIG. 3 shows a schematic representation of a diaphragm structure having magnets, affixed in an ion drive.
Figure 4:
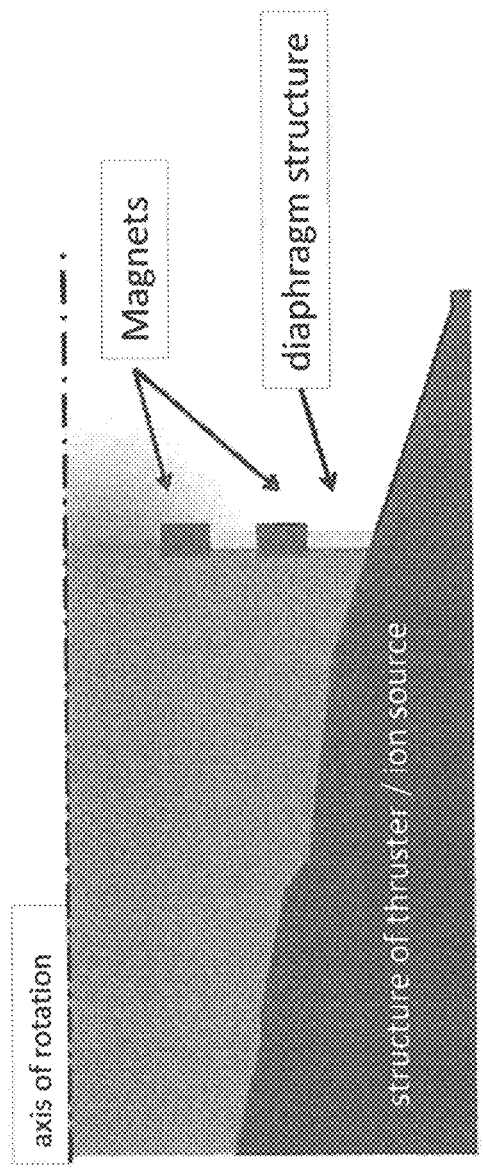
FIG. 4 shows a schematic representation of an ion drive, to illustrate the significant increase in the neutral gas pressure within the thruster.

In FIGS. 3 and 4, only half of the schematic longitudinal section of the ion drive from FIG. 2 is shown.

FIG. 3 schematically shows an array of magnets and a diaphragm structure similar to the arrangement from FIG. 2, with half of the longitudinal section being shown. The diaphragm structure is circular and is disposed with rotation symmetry relative to an axis of rotation, which corresponds to an exit direction of the neutral gas. Schematically, the thruster or the ion source structure is indicated with related magnetic field lines. The image of the magnetic field generated results from the two magnets, which are disposed in circular manner here; this field, as shown in FIG. 4, leads to a constriction of the neutral gas flow and ion flow. This has the advantage of greater ionization efficiency at smaller boost forces of the ion drive.

FIG. 4 schematically shows a constriction of the neutral gas in accordance with the placement of the diaphragm in the discharge chamber of an ion drive as in FIG. 3. In contrast to FIG. 3, here the neutral gas density is shown. This arrangement, here illustrated as an example by a diaphragm structure having two magnetic circular rings, leads to an increase in the neutral gas density within the discharge chamber to the left of the diaphragm. The magnetic rings, with their magnetic fields, ensure that the charged particles are deflected in the direction of the diaphragm hole, thereby leading to concentration of particles in the vicinity of the axis of rotation. In this way, smaller boosts can be efficiently produced. In addition, the required reaction mass is more efficiently consumed. This can have the advantage of reducing the reaction mass. The operating weight of a satellite that can be equipped with an ion drive could thereby be kept low. Also, it is conceivable that at the same reaction mass, this mass can be used more efficiently and therefore a longer useful lifetime is guaranteed.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

The invention claimed is:

1. A discharge chamber of an ion drive, the discharge chamber comprising:
   an ionization region;
   a diaphragm having a diaphragm hole which is vacant and located at a center of said diaphragm for ions from said ionization region to pass therethrough, and wherein said diaphragm is disposed in the discharge chamber so as to increase an ionization efficient in said ionization region
   said diaphragm further comprising a magnet affixed to said diaphragm and disposed in the discharge chamber, wherein the magnet is configured for constricting a magnetic field in a direction perpendicular to a common axis of rotation of at least two of the ion drive, the discharge chamber, and the diaphragm, and
   wherein the common axis of rotation is defined by an essential exit direction of a thrust generating ion beam.

2. The discharge chamber according to claim 1, wherein the diaphragm is magnetic, or wherein the magnet comprises a magnet array that is affixed on the diaphragm, or both.

3. The discharge chamber according to claim 1, wherein the diaphragm is circular and the magnet comprises at least one circular magnet ring.

4. The discharge chamber according to claim 1, wherein the outer dimension of the diaphragm is coordinated with the discharge chamber and the inner dimension of the diaphragm does not go below a predetermined threshold value.

5. The discharge chamber according to claim 3, wherein one of the at least one circular magnet rings is disposed along the diaphragm hole.

6. An ion drive having a discharge chamber according to claim 1.

7. The discharge chamber according to claim 1, wherein the inner dimension of the diaphragm is a radius or a diameter of the diaphragm hole.

8. The discharge chamber according to claim 1, wherein the outer dimension of the diaphragm is a radius or a diameter of the diaphragm.

9. The discharge chamber according to claim 1, wherein the outer dimension is a cross section of the diaphragm.

* * * * *